Nov. 22, 1955
F. LINNEMAN
2,724,612
TWO WHEEL TRAILER
Filed Oct. 6, 1952
3 Sheets-Sheet 1
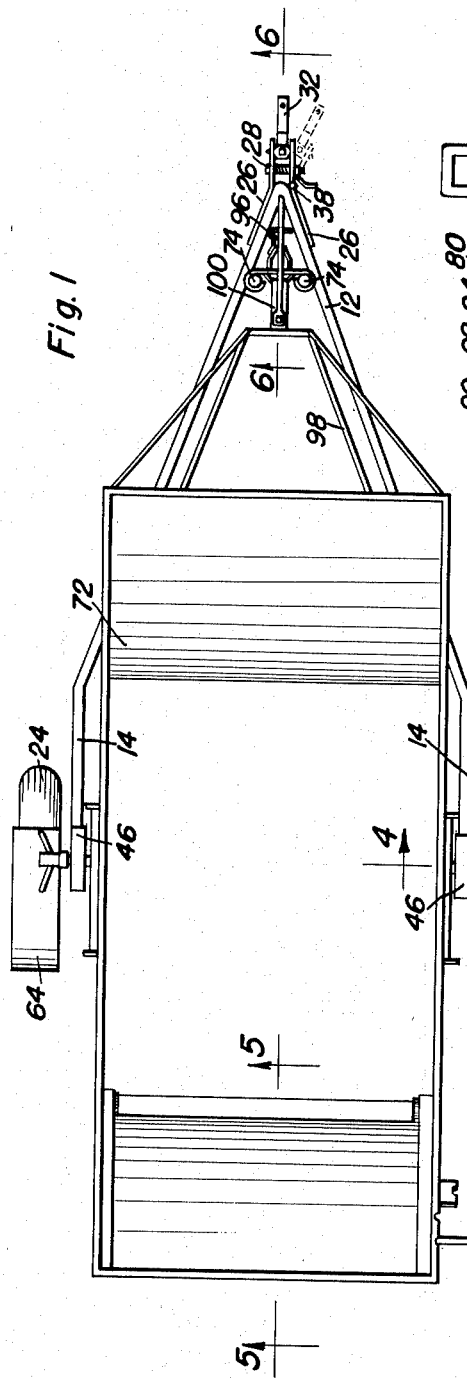
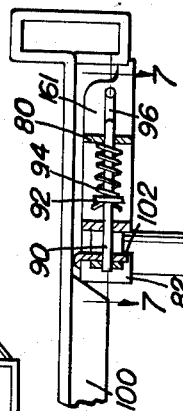
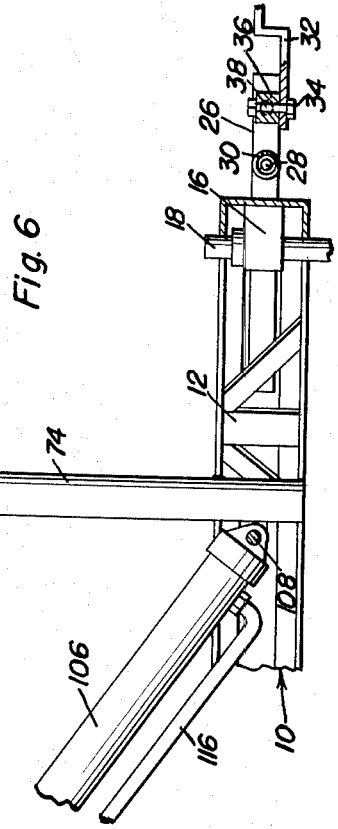
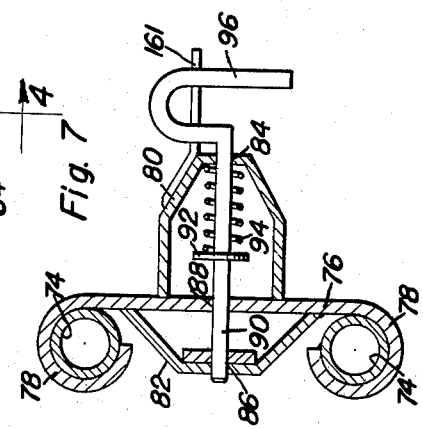
Fred Linneman
INVENTOR.

Nov. 22, 1955                F. LINNEMAN                2,724,612
                            TWO WHEEL TRAILER
Filed Oct. 6, 1952                              3 Sheets-Sheet 2
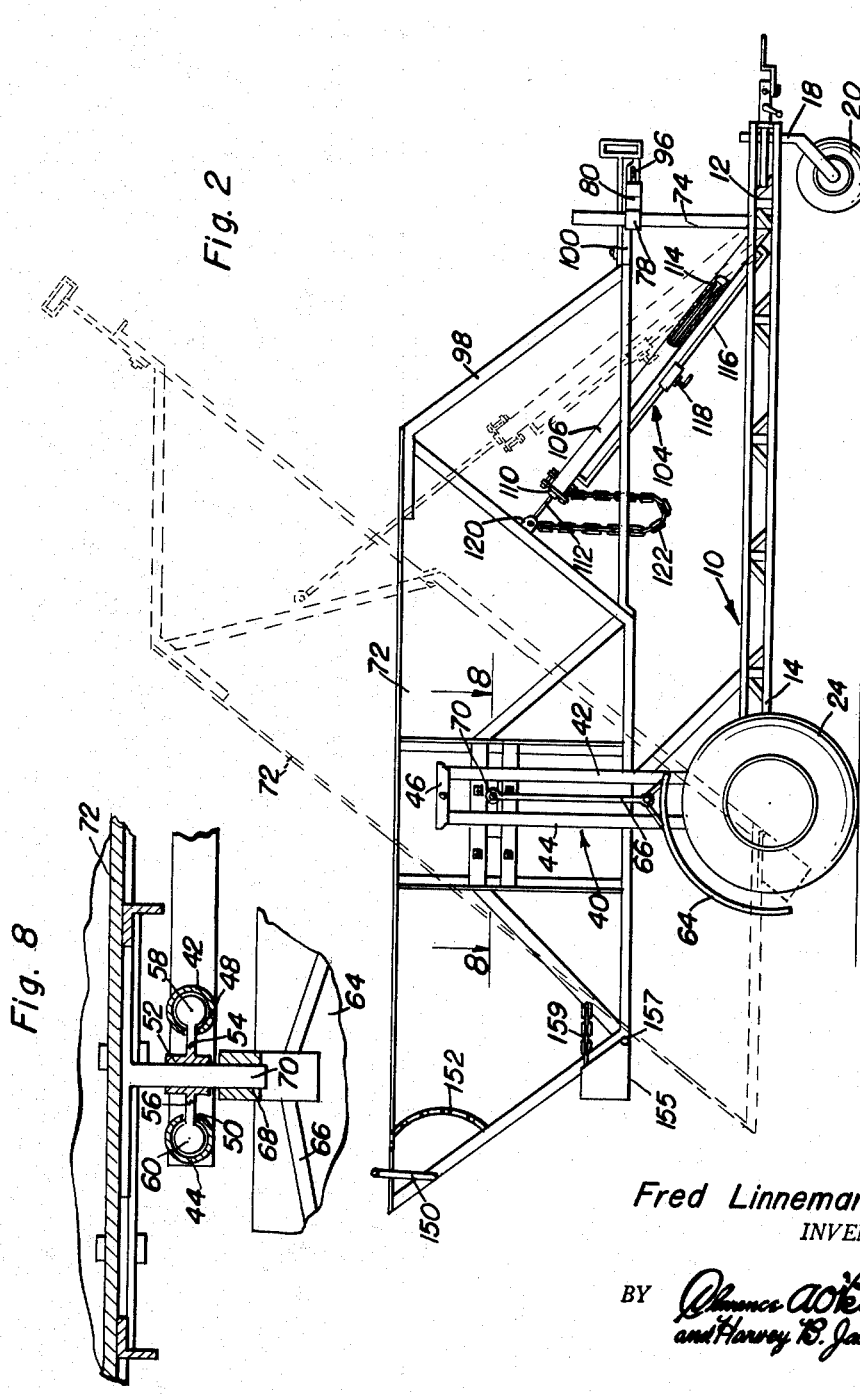
Fred Linneman
INVENTOR.

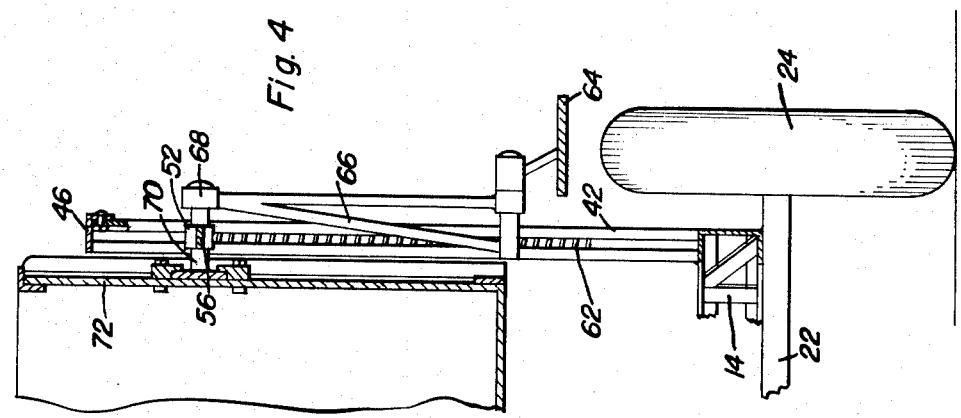
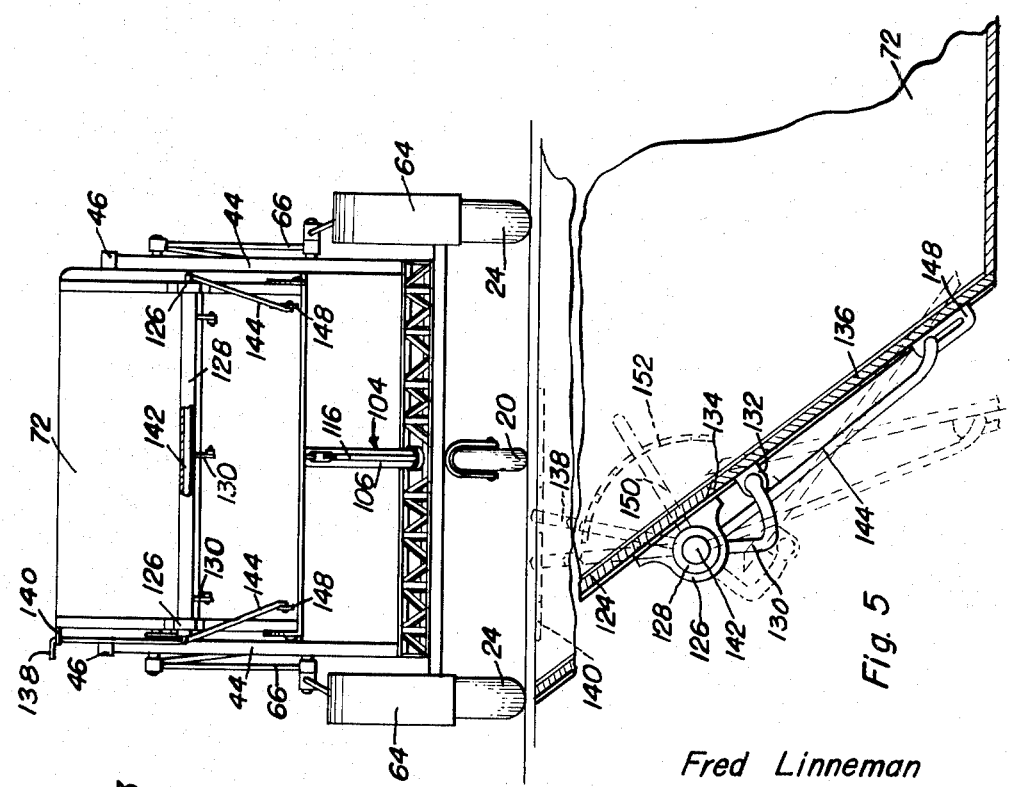

United States Patent Office 2,724,612
Patented Nov. 22, 1955

2,724,612

TWO WHEEL TRAILER

Fred Linneman, Estelline, S. Dak., assignor to Irving A. Hinderaker, Watertown, S. Dak.

Application October 6, 1952, Serial No. 313,255

2 Claims. (Cl. 298—19)

This invention relates to new and useful improvements in trailers and the primary object of the present invention is to provide a trailer including a vertically swingable dump box, and means cushioning the swinging movement of the dump box as it is moved into and out of its dumping position.

Another important object of the present invention is to provide a combined cushioning and locking means for vertically swingable dump boxes that will cushion the swinging movement of a dump box into and out of dumping position, and which means may also lock the dump box against swinging movement.

Yet another object of the present invention is to provide a two wheel trailer involving a wheeled frame and novel and improved dump box mounting means to resiliently support a dump box for movement with the frame.

A further object of the present invention is to provide a two wheeled trailer, involving a vertically rockable dump box and lever actuated closure means at the rear end of the box to permit discharging of the material in the box when the latter is rocked to a dumping position.

A still further aim of the present invention is to provide a trailer of the aforementioned character, that is extremely simple and practical in construction, strong and reliable in use, efficient and durable in operation, small and compact in structure, inexpensive to manufacture, assemble and maintain, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, in which:

Figure 1 is a top plan view of the present trailer;

Figure 2 is a side elevational view of Figure 1, with dotted lines showing the dump box moved to its dumping position;

Figure 3 is a rear elevational view of Figure 2;

Figure 4 is an enlarged detailed vertical sectional view taken substantially on the plane of section line 4—4 of Figure 1;

Figure 5 is an enlarged detailed vertical sectional view taken substantially on the plane of section line 5—5 of Figure 1;

Figure 6 is an enlarged detailed vertical sectional view taken substantially on the plane of section line 6—6 of Figure 1;

Figure 7 is an enlarged horizontal sectional view taken substantially on the plane of section line 7—7 of Figure 6; and Figure 8 is an enlarged detailed horizontal sectional view taken substantially on the plane of section line 8—8 of Figure 2.

Referring now to the drawings in detail, wherein for the purpose of illustration, there is disclosed a preferred embodiment of the present invention, the numeral 10 represents an elongated wheeled frame including a V-shaped forward end portion 12, and a pair of parallel rear end portions 14. A bearing 16 fixed to the forward end portion 12 journally receives the supporting shaft 18 of a forward caster wheel 20. An axle 22 fixed to the frame 10, and more particularly end portions 14, supports ground wheels 24.

Hitch means is provided whereby the frame may be coupled to a towing vehicle. This hitch means comprises a pair of straps 26 having their rear ends suitably fixed to the end portion 12. A fastener 28 joins the forward parallel ends of the straps 26, and is embraced by a coil spring 30 whose ends engage the forward ends of the straps to urge the same apart. A tongue 32 is pivotally attached, as at 34, to a block 36 having trunnions 37 that enter accommodating apertures in the forward ends of the straps 26. One of the straps 26 is composed of two sections that are hinged, as at 38, so that the tongue 32 and block 36 may be removed from between the straps after the nut of fastener 28 is removed.

Frame 10 includes a pair of vertical side members 40 each of which comprises forward and rear vertical tubes 42 and 44, whose lower ends are fixed by welding or the like to the portions 14. The upper ends of the forward tubes 42 are connected to the upper ends of the rear tubes 44 by rigid bars 46 that retain the tubes parallel to each other. The upper portions of the tubes 42 and 44 are formed with vertical slots 48 and 50, and the slots 48 in the forward tubes face the slots 50 in the rear tubes.

Horizontal bearings 52 are slidably supported by the side members 40 and fixedly support forwardly and rearwardly projecting arms 54 and 56 that are slidably received in the slots 48 and 50. The arms 54 and 56 terminate in plate portions 58 and 60 that are engaged with the upper ends of coil springs 62 in the tubes 42 and 44.

A wheel shield 64 is disposed over and behind each wheel 24 and these shields are supported by hangers 66 having sockets 68 at their upper ends that receive coaxial trunnions 70 which project through the bearings 52. The trunnions 70 are suitably fixedly attached to the sides of a dump-bed or box 72 to permit vertical swinging or rocking movement of the bed on the side members 40.

Means is provided for locking the box 72 against swinging movement. This means comprises of a pair of vertical rods 74 fixed to the end portion 12. A horizontal strap 76 is provided with curved ends 78 that are engaged about the rods 74 for vertical sliding movement. The strap 76 fixedly supports forward and rear U-shaped guides 80 and 82 having registering apertures 84 and 86 that also register with a central aperture 88 in strap 76. A locking pin 90 is slidably received in the apertures 84, 86, 88 and carries an abutment 92 for a coil spring 94 that embraces the pin 90, and which spring is biased against guide 80 to urge the locking pin 90 rearwardly. A hand grip 96 is formed at the forward end of the pin 90, whereby the same may be retracted against action of the spring 94.

A forwardly extending tongue supporting frame 98 is fixed to the forward end of the box 72 and supports a tongue 100 having a depending apertured portion 102 that will enter the guide 82 to receive the rear end of the pin 90.

A combined locking and cushioning means 104 is provided between the forward end of box 72 and the forward end portion 12 of frame 10. This means comprises a cylinder 106 having its lower closed end pivoted, as at 108, to the end portion 12. The upper end of cylinder 106 is provided with an apertured cap 110, that slidably receives the rod 112 of a piston 114 within cylinder 106. A conduit 116 is terminally attached to the ends of the cylinder 106, and has a petcock or valve 118 therein to control the flow of liquid through the conduit 116. Rod 112 is pivotally attached to an ear 120 on the box 72 and a limiter chain 122 terminally attached to the ear 120, and the upper end of cylinder 106 limits the upward swinging movement of the forward end of box 72.

Closure means is provided at the rear end of the box 72. This closure means includes an upper rigid end wall or panel 124, having bearings 126 fixed thereto, that rotatably support a horizontal tube 128. Longitudinally spaced V-shaped arms 130 are spaced transversely of the box 72 and are fixed to the tube 128 and include outturned forward ends that are pivotally received by ear 132 fixed adjacent the upper beveled edge 134 of a lower moveable end wall or panel 136. A handle or lever 138 is fixed to one end of tube 128 for rotating the same. A notched angle bar 140 is fixed to one side of the box 72 and its notches will selectively receive the handle 138 to hold the tube 128 in a selected rotated position.

A shaft 142 is journaled for rotation in the tube 128 and its ends extend from the ends of the tube 128 to support links 144 that are pivotally and slidably connected to plates 148 fixed to the panel 136 adjacent the lower edge thereof. A handle or lever 150 is fixed to one end of the shaft 142 to permit rotation of the shaft. A notched arcuate strap 152 is fixed to the box 72, at one side thereof, and its notches will selectively receive the lever 150 to retain the shaft 142 is a selected rotated position.

Through this closure arrangement, the panel 136 may be swung vertically by tube 128 about the lower ends of the links 144 as pivots, or the panel 136 may be swung vertically by shaft 142 about the forward ends of the arms 130 as pivots. This feature is emphasized in Figure 5 of the drawings, wherein the panel 136 is shown by full lines in its closed position and by dotted lines in various pivoted positions.

In practical use of the present invention, the box 72 will be disposed in a substantially horizontal position as illustrated in Figure 2 of the drawings, whereupon a suitable material may be charged into the box 72. The trunnions 70 are located closer to the forward end of the box 72 than to the rear end thereof, so that when the locking pin 90 is retracted, the weight of the material within the box 72 will cause the box to swing to its dumping position as illustrated by dotted lines in Figure 2.

Obviously, before the locking pin 90 is retracted, one of the handles 138 or 150 is actuated in order to move the panel 136 to an open position. As the dump box 72 pivots to its dumping position, piston rod 112 will be extended from the cylinder 106 and fluid in the upper end of the cylinder 106 will be forced therefrom by the piston 114 and into the lower end of the cylinder 106, it being understood that the valve 118 will be in its open position to permit the fluid to pass through the conduit 116 from the upper end of the cylinder 106 to the lower end of the cylinder 106.

The tongue supporting frame 98 at the forward end of the box 72 adds sufficient weight to the box 72, when empty, to urge the forward end of the box downwardly. However, when the box 72 is filled with a suitable material, and as the trunnions 70 are located closer to the forward end of the box 72 than the rear end thereof, the box will have a tendency to pivot to the dotted line position shown in Figure 2.

After the material has been discharged from the box 72, the additional weight afforded by frame 98 will cause the forward end of the box 72 to move downwardly. During downward movement of the forward end of box 72, piston rod 112 will be forced into cylinder 106 and the piston 114 will force fluid in the lower end of the cylinder 106 through conduit 116 and into the upper end of the cylinder 106. Thus, cushioning of the downward movement of the box 72 is provided, as well as cushioning of the box during its movement to a dumping position. The valve 118 may be moved to a closed position to prevent the passage of fluid from one end of the cylinder 106 to the other end thereof. This feature provides an additional locking means for the box 72 and will aid in preventing rocking movement of the box 72 until the valve 118 is moved to its open position.

In order to aid in the discharging of material from the hopper and direct the material being discharged away from and rearwardly of the hopper, there is provided an U-shaped deflector member 155 whose ends are pivotally attached, as at 157, to the sides of the hopper at the rear end thereof. The ends of member 155 are connected to the sides of the hopper by chains 159 which are terminally attached to the member 155 and which are engaged with hooks or the like fixed to the sides of the hopper to adjust the member 155 about the pivots 157.

Pin 90 may be held forwardly in a retracted position out of engagement with the tongue 102 by rotating the head grip 96, after it is pulled rearwardly, until the same engages a holding arm or leg 161 fixed to guide 80 (Figures 6 and 7).

Having described the invention, what is claimed as new is:

1. A trailer comprising an elongated frame having forward and rear ends, hitch means at the forward end of the frame, a caster wheel at the forward end of the frame to aid in supporting the frame above the ground, a pair of side wheels on the rear end of the frame and coacting with the caster in supporting the frame for movement, said frame including a pair of vertical members, a dump box pivoted to said members for vertical swinging movement, releasable locking means between the forward end of the frame, and the box to prevent swinging movement of the box relative to the frame, said box having a closure means at its rear end to permit dumping of material from the box, and combined locking and cushioning means between the box and the frame to cushion swinging movement of the frame and to lock the frame against swinging movement, said closure means including a rigid upper end panel, a movable lower end panel, a horizontal tube supported on the upper end panel adjacent the lower edge thereof, arms fixed to the tube and pivoted to the lower end panel adjacent an upper edge thereof, a handle adjustably secured to the tube for rotating the same, a shaft journaled in the tube, links connected to opposite end portions of the shaft and to the lower end panel adjacent a lower edge thereof, and a second handle adjustably secured to the shaft for rotating the shaft whereby said lower panel is rotatable about the axis of said horizontal tube within the limits of either the arms fixed to said tube or the links connected to the shaft in said tube.

2. An end gate for a dump box comprising a rigid upper end panel secured transversely of the dump box, a movable lower end panel, a horizontal tube rotatably supported on the upper end panel adjacent a lower edge thereof, arms fixed to the tube and pivoted to the lower end panel adjacent an upper edge thereof, a handle adjustably secured to the tube for rotating the same, a shaft journalled in the tube, links connected to opposite end portions of the shaft and to the lower end panel adjacent a lower edge thereof, and a second handle adjustably secured to the shaft for rotating said shaft whereby said lower panel is rotatable about the axis of said horizontal tube within the limits of either the arms fixed to said tube or the links connected to the shaft in said tube.

References Cited in the file of this patent

UNITED STATES PATENTS

| | | |
|---|---|---|
| 678,470 | Hill | July 16, 1901 |
| 1,602,484 | Gorsuch | Oct. 12, 1926 |
| 1,621,075 | Larkin | Mar. 15, 1927 |
| 2,410,046 | Burns | Oct. 29, 1946 |
| 2,491,417 | Pflantz et al. | Dec. 13, 1949 |
| 2,505,425 | Newell | Apr. 25, 1950 |
| 2,694,599 | Porter et al. | Nov. 16, 1954 |